No. 809,728. PATENTED JAN. 9, 1906.
A. D. NEWTON.
ELECTRICAL HEATING SYSTEM.
APPLICATION FILED JULY 9, 1904.
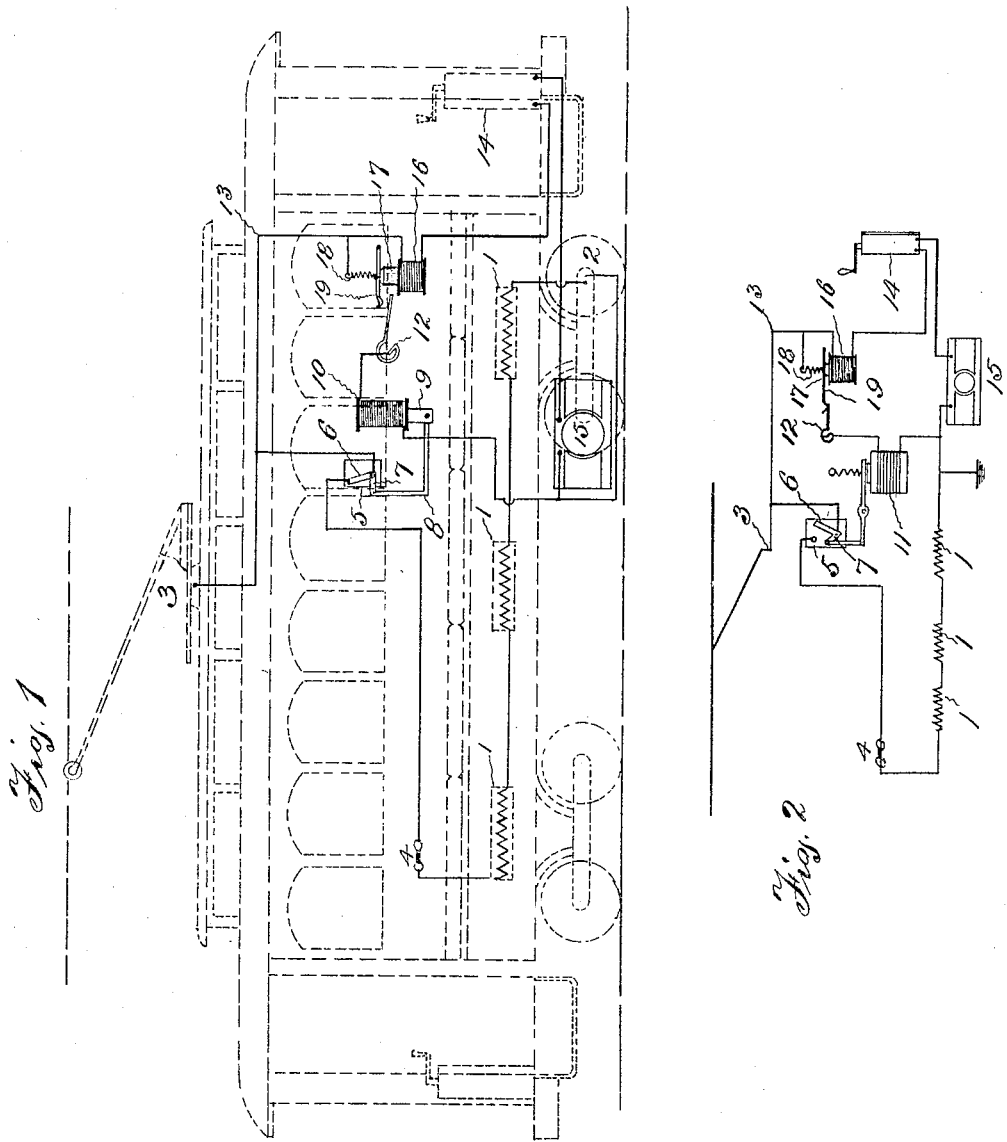

UNITED STATES PATENT OFFICE.

ARTHUR D. NEWTON, OF HARTFORD, CONNECTICUT, ASSIGNOR TO GENERAL ELECTRIC COMPANY, A CORPORATION OF NEW YORK.

ELECTRICAL HEATING SYSTEM.

No. 809,728.      Specification of Letters Patent.      Patented Jan. 9, 1906.

Application filed July 9, 1904. Serial No. 215,860.

*To all whom it may concern:*

Be it known that I, ARTHUR D. NEWTON, a citizen of the United States, residing at Hartford, in the county of Hartford and State of Connecticut, have invented a new and useful Electrical Heating System, of which the following is a specification.

This invention relates to a system for heating electric cars, which is arranged to cut out the heaters when the motors are using more than a predetermined amount of current.

The object of the invention is to provide a simple system of this nature in which the point at which the heater-circuit is opened varies according to the temperature in the car.

The invention resides in a system having a circuit which includes the heaters and an automatic switch that is opened and closed by a magnet which is included in a circuit which includes a thermostat that is engaged by a contact which moves into various positions according to the amount of current that the motors are using.

Figure 1 of the accompanying drawings shows in outline an electric-railway car provided with a heater system that embodies this invention, the system being illustrated as in the condition when current is flowing through the heaters. Fig. 2 shows a diagrammatic view of the system illustrated as in the condition when the heaters are cut out.

The heaters 1 may be of any common form and construction and may be arranged in any desired manner in the car. The heaters are shown as connected in series in a circuit which has one end connected with the ground through a wheel 2 and the other end connected with a source of electrical energy, as the main supply-wire from the trolley-pole 3. Included in the heater-circuit is a hand-switch 4 of any desired type and an automatic switch 5, having a blade 6, that is oscillated at the required time for opening and closing the heater-circuit. Fastened to the automatic switch-blade is an arm 7, which is connected with a frame 8, that is joined with the core 9 of a solenoid 10. A common field-magnet 11 could be used, as shown in Fig. 2, instead of a solenoid. When current is passing through the coils of the solenoid or field-magnet, the core or armature and the frame are drawn upwardly and the switch-blade is oscillated so as to open the heater-circuit. When the solenoid or field-magnet is not energized, the frame drops by gravity and causes the blade to close the heater-circuit. One end of the circuit through the coil of the heater-switch solenoid is connected with the ground and the other is connected with a thermostat 12.

In the main circuit 13 from the trolley-pole to the controller 14 and motor 15 is a solenoid 16. The core 17 of this solenoid is normally held raised by a spring 18. Moved by this core is a contact 19, that is connected with the main wire and is adapted to engage the thermostat. When a large amount of current is flowing to the motors, the main-circuit solenoid draws the core downwardly and causes the contact which it carries to engage the thermostat, and thus close the circuit through the thermostat and automatic-switch solenoid, which causes the switch-solenoid to throw the automatic switch and open the heater-circuit. The thermostat is so arranged that if it is warm the main-circuit solenoid-contact will engage it sooner than if it is cold—that is, if it is warm it requires only a small flow of current through the main-circuit solenoid to close the thermostat and switch-solenoid circuit and cause the heater-circuit to be opened, and if it is cold it requires a large flow of current through the main-circuit solenoid to make the contact which causes the heater-switch to be opened.

With this system the heaters are cut out whenever the motors require a large amount of current—that is, the heaters are cut out below the peak of the load in order that all of the current may be available for the motors— and this cutting-out point varies by reason of the thermostat according to the temperature in the car. This system relieves the central station of temporarily heavy loads, for the heaters are cut out when the motors require the greatest currents and yet the car is kept at the required temperature, for the reason that the point of cutting out the heaters varies according to the temperature. If it is warm, the heaters will be cut out by less current passing through the motors than they will if it is cold, and this tends to keep the load at the power-station uniform.

The invention claimed is—

1. In combination, a source of current-supply, a heating-circuit and a circuit including a translating device connected to said source of current-supply, a switch in said heating-circuit, and means responsive to the mutual action of the local temperature and the current in the circuit containing the translating device for operating said switch.

2. In a car-heating system, a source of current-supply, a heating-circuit and a motor-circuit connected to said source of current-supply, and governing means for said heating-circuit responsive to the mutual action of the temperature in the car and the current in the motor-circuit.

3. In combination, a source of current-supply, a heating-circuit and a motor-circuit connected to said source of supply, a switch for controlling said heating-circuit, and a thermostat and an electroresponsive device in the motor-circuit for opening and closing said switch.

4. In combination, a source of current-supply, a heating-circuit and a motor-circuit connected to said source of current-supply, a switch for controlling said heating-circuit, and a thermostat and electroresponsive device in the motor-circuit tending to operate said switch upon variations in the local temperature and in the motor-current.

5. In combination, a source of current-supply, a heating-circuit and a motor-circuit connected to said source of current-supply, a switch in said heating-circuit, an electromagnet for operating said switch, a switch controlling the circuit of said electromagnet, and means responsive to variations in local temperature and in current in said motor-circuit for opening and closing said latter switch.

6. In combination, a source of current-supply, a heating-circuit and a motor-circuit connected to said source of current-supply, a switch in said heating-circuit, an electromagnet for operating said switch, a switch controlling the circuit of said electromagnet, a thermostat operating to produce relative movements of the members comprising said latter switch upon variations in local temperature, and an electromagnet in the motor-circuit also arranged to produce relative movements of the members of said latter switch upon variations in the motor-current.

ARTHUR D. NEWTON.

Witnesses:
H. R. WILLIAMS,
ETHEL M. LOWE.